United States Patent [19]
Beamer

[11] Patent Number: 5,148,859
[45] Date of Patent: Sep. 22, 1992

[54] AIR/LIQUID HEAT EXCHANGER

[75] Inventor: Henry E. Beamer, Middleport, N.Y.

[73] Assignee: General Motors Corporation, Detroit, Mich.

[21] Appl. No.: 653,588

[22] Filed: Feb. 11, 1991

[51] Int. Cl.⁵ .................. F25B 19/00; B64D 33/10
[52] U.S. Cl. .................. 165/41; 165/911; 165/44; 123/41.01; 62/304; 62/52.1; 62/239; 62/DIG. 5; 244/57
[58] Field of Search .............. 165/41, 44, 911, 912; 123/41.01; 62/304, 305, 259.4, 241, DIG. 5, 52.1, 239; 261/153; 244/57

[56] References Cited
U.S. PATENT DOCUMENTS

| 2,925,722 | 2/1960 | Blackburn et al. | 62/DIG. 5 |
| 3,769,947 | 11/1973 | Crain | 123/41.01 |
| 4,031,710 | 6/1977 | Rideout | 62/171 |
| 4,494,384 | 1/1985 | Lott | 62/279 |

Primary Examiner—Albert W. Davis, Jr.
Attorney, Agent, or Firm—Ronald L. Phillips

[57] ABSTRACT

An air/liquid heat exchanger having a refrigerant spray providing evaporative cooling.

3 Claims, 1 Drawing Sheet

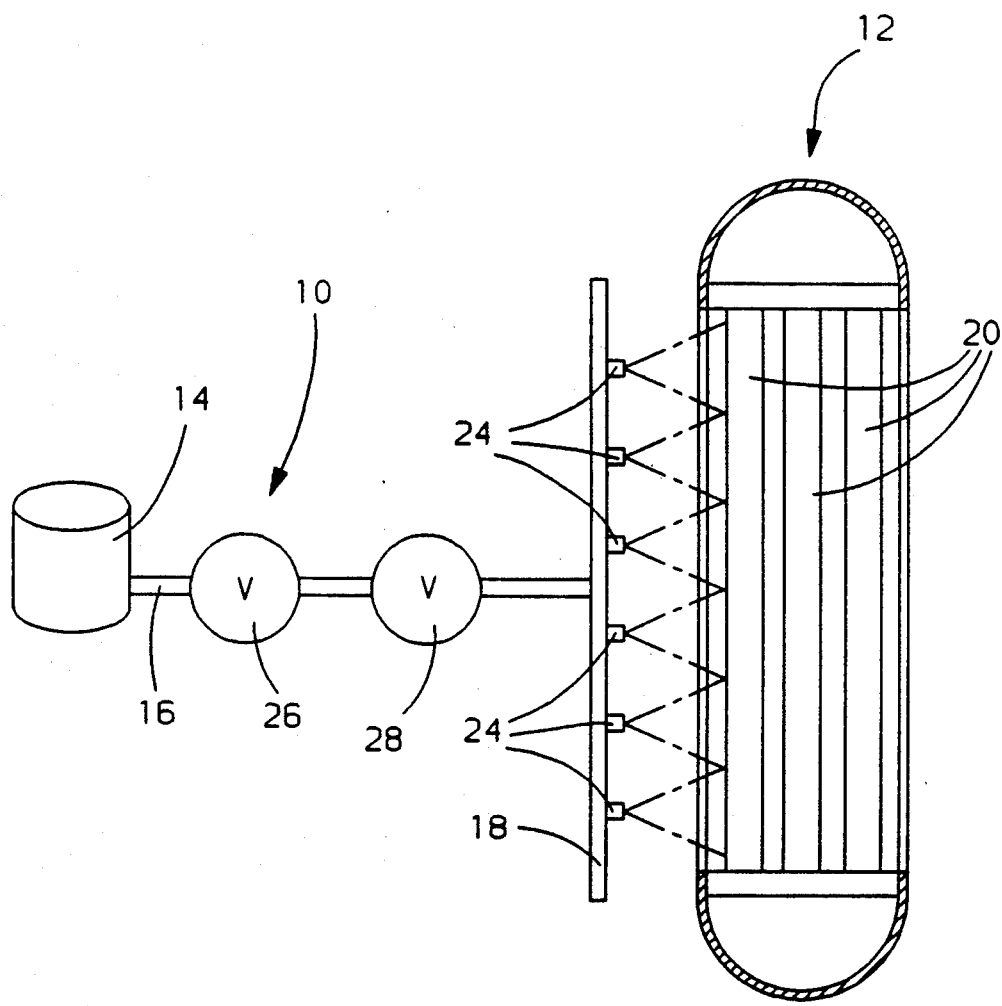

AIR/LIQUID HEAT EXCHANGER

TECHNICAL FIELD

This invention relates to evaporative cooling for air/liquid heat exchangers and more particularly to that used for high performance engines.

BACKGROUND OF THE INVENTION

One way of significantly enhancing the performance of air/liquid heat exchangers is to install one or more spray tubes to spray a liquid onto their heat transfer surface to thereby utilize the latent heat of evaporation of this liquid to boost the heat transfer. The sprayed liquid is vaporized as it passes through the air side flow circuit of the heat exchanger, and the heat removed through evaporation is added to the sensible heat removed by the normal cooling air. This performance enhancement can be used to increase the overall heat transfer capacity of the heat exchanger and/or reduce the cooling air mass flow required while maintaining constant heat transfer performance.

For example, in high performance piston engine powered/propeller driven aircraft where sufficient heat transfer performance is available to cool the engine(s) without evaporative cooling, a very significant reduction in the aerodynamic drag on the aircraft can be achieved with the addition of evaporative cooling by the resulting reduction in the cooling air then required for the heat exchanger(s). This can be a very significant advantage recognizing that the heat exchanger(s) on a high performance aircraft can represent as much as about 50% of the total drag. Water is the liquid that is normally used for the evaporative cooling because of its high latent heat of evaporization. In high performance engine powered/propeller driven aircraft, the engine coolant temperatures are normally maintained between 180° to 220° F. This temperature range is relatively low compared to conventional aircraft and motor vehicle piston engine applications and limits the quantity of water that can be evaporated because of the low temperature difference between the coolant and the atmospheric boil temperature of water, thereby limiting the heat transfer performance gain possible.

SUMMARY OF THE INVENTION

The present invention increases the capacity of evaporative cooling for short duration duty cycles such as those encountered in aircraft speed record attempts by simply using a refrigerant as the evaporative cooling medium that allows aerodynamic cooling drag reductions not otherwise possible. The reduction in cooling air flow that is obtainable depends on the heat rejection rates required, the duration required and the quantity of refrigerant available. As indicated above, the evaporative heat transfer has heretofore been limited by the small temperature difference between the atmospheric boil point of water and the engine coolant temperature which restricts the quantity of water that can be evaporated in any given time. The refrigerant, though it has a latent heat value considerably less than that of water, has a significantly larger beneficial offsetting factor in is much lower atmospheric boiling point making it possible to evaporate a much larger quantity of refrigerant than water. That is, the increase in total evaporative heat transfer provided by the refrigerant significantly outweighs the lower latent heat value compared to water because of the much faster evaporative rate with the refrigerant.

It is therefore an object of the present invention to provide an air/liquid heat exchanger with new and improved evaporative cooling.

Another object is to provide an air/liquid heat exchanger with a refrigerant spray for its air side heat transfer surface for effecting evaporative cooling.

These and other objects, advantages and features of the present invention will become more apparent from the following detailed description and accompanying drawing.

BRIEF DESCRIPTION OF THE DRAWING

The sole FIGURE in the drawing is a schematic view of an air/liquid heat exchanger embodying the present invention.

DESCRIPTION OF THE PREFERRED EMBODIMENT

Referring to the drawing, there is shown an evaporative cooling system 10 for a radiator 12 of a high performance piston engine powered/propeller driven aircraft (not shown). The system 10 comprises a refrigerant supply tank 14 connected by a pipeline 16 to spray tubes 18 (only one being shown) arranged across the upstream face of the radiator. The radiator 12, which is connected with the aircraft engine's cooling circuit, is of a conventional type with a tube and air center core 20, onto which nozzles 24 formed on the spray tubes along the length thereof are directed to spray refrigerant from the supply tank for evaporative cooling.

The tank 14 contains a refrigerant that is preferably of a non-ozone depleting type such as CFH134a and is selectively supplied to the spray tubes by an on/off valve 26. Control of the refrigerant flow rate is provided by sizing of the nozzles 24 and/or an expansion valve 28 (or fixed orifice with suitable characteristics) located in the line 16 between the on/off valve and he spray nozzles.

The improved aircraft performance that can result from use of the above evaporative refrigerant cooling can be very significant. For example, it is projected that on a special engine powered/propeller driven aircraft designed to challenge the speed record where the heat transfer performance of the radiator design is sufficient without evaporative cooling, the addition of the above evaporative refrigerant cooling can reduce the cooling air required by over 30% resulting in a significant reduction in the heat exchanger induced aerodynamic drag on the aircraft.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. For example, evaporative refrigerant cooling is also applicable to other air/liquid heat exchangers such as an air side oil cooler or special condenser requiring high heat transfer capacity for only short time durations. All such modifications and variations are within the scope of the invention as determined by the appended claims when interpreted in accordance with the breadth to which they are fairly, legally and equitably entitled.

What is claimed is:

1. A radiator for the water cooling system of a high performance aircraft piston engine where the water temperature ranges 180°–220° F., said radiator having a core with an upstream face, spray means directed toward said upstream core face, and refrigerant supply means for selectively supplying a refrigerant to said spray means for spraying onto the heat transfer surface of said core to effect supplemental evaporative cooling that significantly increases the heat capacity of the cooling system and significantly reduces aircraft drag, said refrigerant being of a kind having an atmospheric boiling point substantially lower than water.

2. The combination set forth in claim 1 wherein said supply means comprises a refrigerant supply tank, an on/off valve between the tank and spray means and an expansion valve between the on/off valve and the spray means.

3. The combination set forth in claim 1 wherein said supply means comprises a refrigerant supply tank, an on/off valve between the tank and spray means and a fixed orifice between the on/off valve and the spray means.

* * * * *